United States Patent [19]

Tatebayashi et al.

[11] Patent Number: 5,124,117
[45] Date of Patent: Jun. 23, 1992

[54] CRYPTOGRAPHIC KEY DISTRIBUTION METHOD AND SYSTEM

[75] Inventors: Makoto. Tatebayashi, Vienna, Va.; David B. Newman, Jr., Rockville, Md.

[73] Assignee: Matsushita Electric Industrial Co., Ltd., Osaka, Japan

[21] Appl. No.: 675,035

[22] Filed: Mar. 25, 1991

Related U.S. Application Data

[63] Continuation of Ser. No. 390,048, Aug. 7, 1989, abandoned.

[51] Int. Cl.$^5$ .......................... H04L 9/08; H04L 9/30
[52] U.S. Cl. ........................ 380/21; 380/30; 380/49
[58] Field of Search ... 364/200 MS File, 900 MS File; 380/21, 23–25, 30, 49, 50

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,283,599 | 8/1981 | Atalla | 380/24 |
| 4,386,233 | 5/1983 | Smid et al. | 380/25 |
| 4,405,829 | 9/1983 | Rivest et al. | 380/30 |
| 4,424,414 | 1/1984 | Hellman et al. | 380/30 |
| 4,458,109 | 7/1984 | Mueller-Schloer | 380/30 |
| 4,514,592 | 4/1985 | Miyaguchi | 380/30 |
| 4,567,600 | 1/1986 | Massey | 380/21 |

Primary Examiner—Bernarr E. Gregory
Attorney, Agent, or Firm—David Newman & Associates

[57] ABSTRACT

A method for establishing cryptographic communications comprising the steps of: generating a first key-encryption-key signal; transforming, using a public-key-encryption algorithm, the first key-encryption-key signal to a first ciphertext signal; generating a second key-encryption-key signal; transforming, using the public-key-encryption algorithm, the second key-encryption-key signal to a second ciphertext signal; decoding, using the public-key-decryption algorithm, the first ciphertext signal and the second ciphertext signal, thereby generating the first key-encryption-key signal and the second key-encryption-key signal; transforming, using a secret-key-encryption algorithm, the first key-encryption-key signal and the second key-encryption-key signal to a third ciphertext signal; and decoding, using a secret-key-decryption algorithm and the first key-encryption-key signal, the third ciphertext signal thereby generating the second key-encryption-key signal.

35 Claims, 6 Drawing Sheets

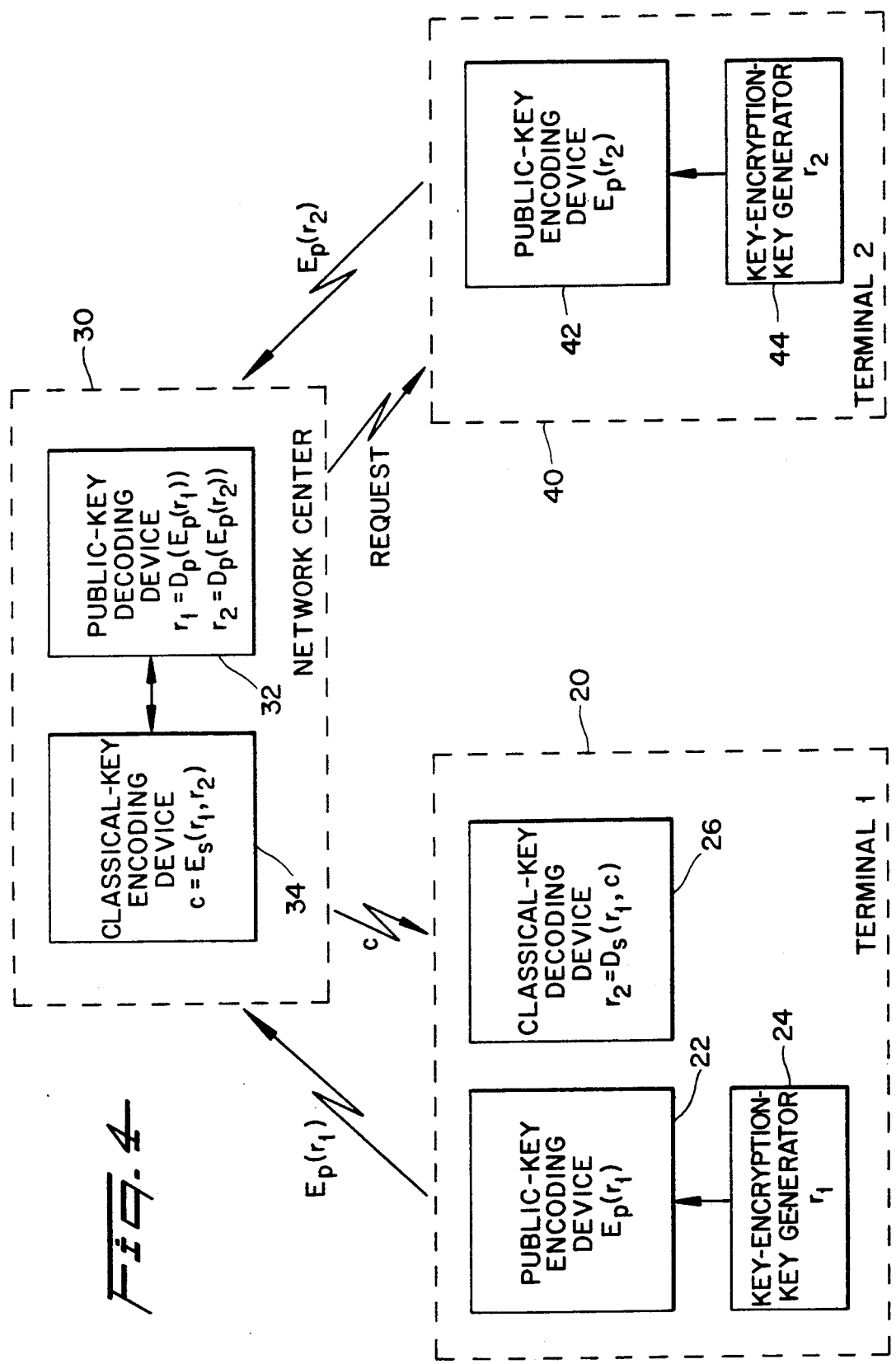

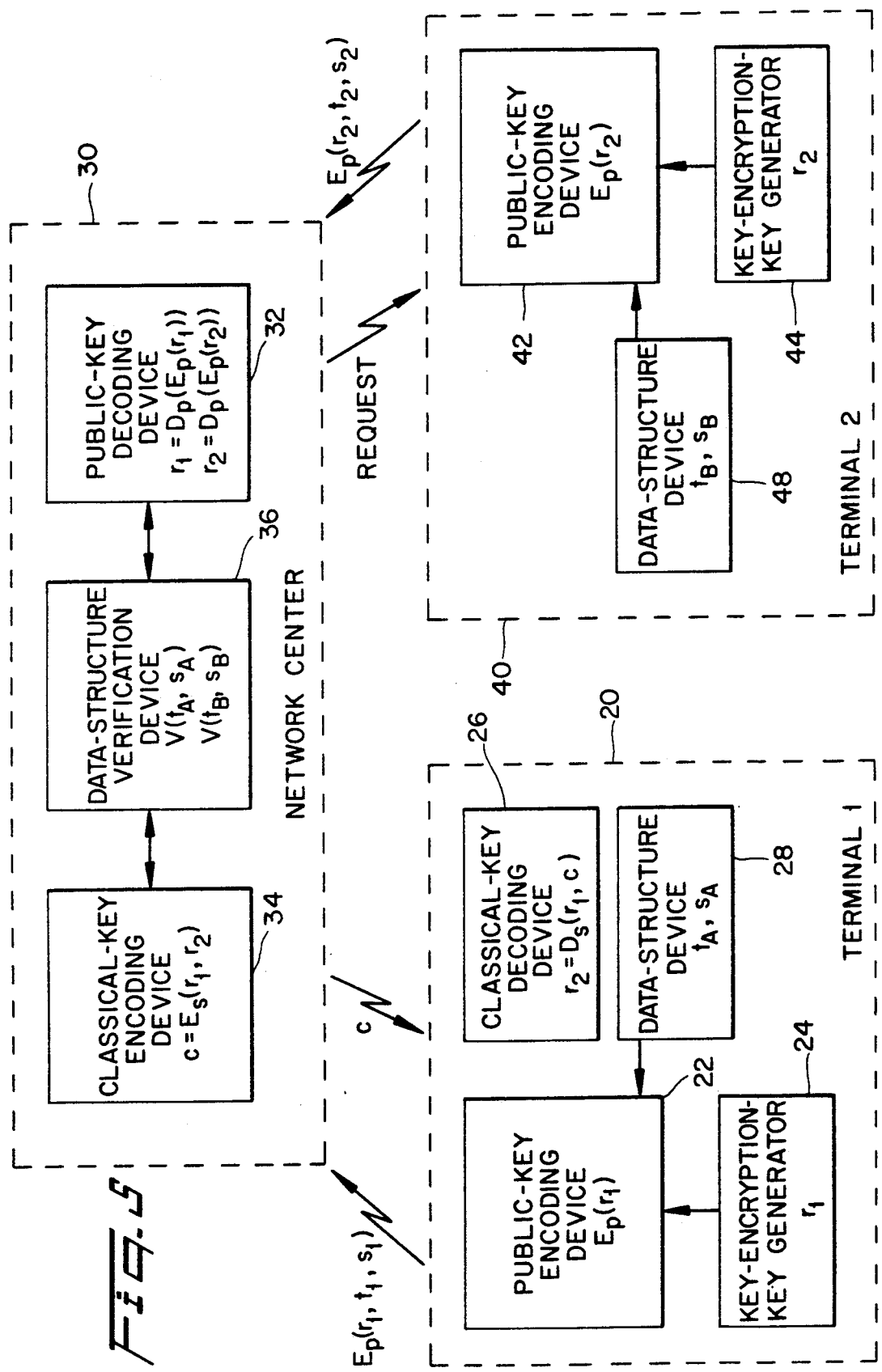

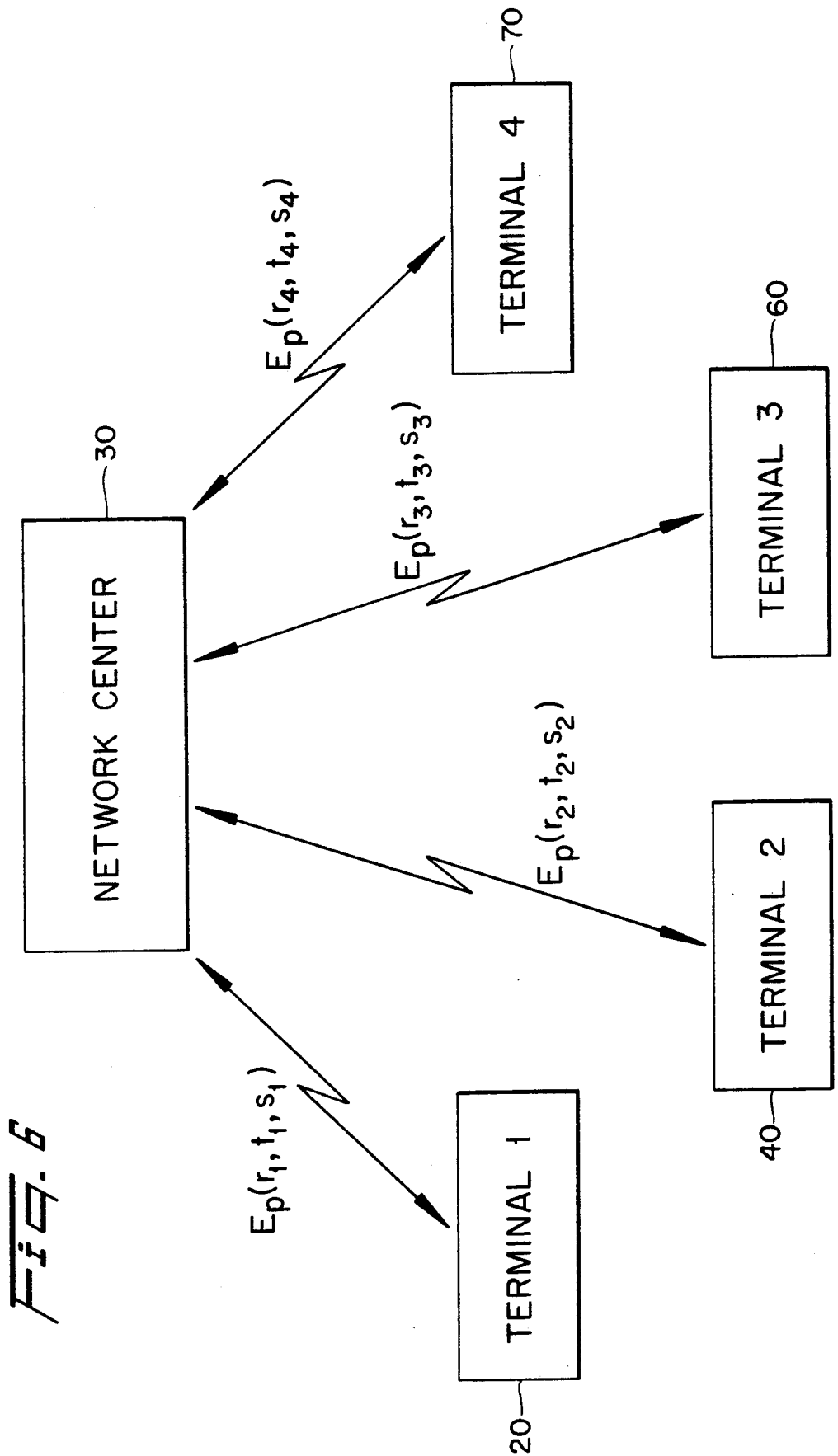

CRYPTOGRAPHIC KEY DISTRIBUTION METHOD AND SYSTEM

This application is a continuation of application Ser. No. 07/390,048, filed Aug. 7, 1989, now abandoned.

BACKGROUND OF THE INVENTION

This invention relates to digital mobile communications systems and more particularly, to a method and system employing a protocol for establishing a secure secret key between two or more terminals through a network center.

1. Related Patents

This invention employs public-key-encryption concepts as disclosed in U.S. Pat. No. 4,200,770 entitled "Cryptographic Apparatus and Method", to W. Diffie and M. E. Hellman Apr. 29, 1980; U.S. Pat. No. 4,405,829 entitled "Cryptographic Communications System and Method", to R. Rivest, A. Shamir and L. Adleman, Sep. 20, 1983; and, U.S. Pat. No. 4,424,414, entitled "Exponentiation Cryptographic Apparatus and Method", to S. C. Pohlig and M. E. Hellman, which are all expressly incorporated herein by reference.

2. Description of the Prior Art

Awareness of the value of information together with advances in modern state-of-the-art telecommunications technologies including personal computers, local area networks, distributed data bases, packet radio, satellite teleconferencing, electronic mail, and electronic funds transfer, has stimulated and increased awareness of the vulnerability of communications links to intercept and of the susceptibility of databases to exploitation and tamper. This same telecommunications revolution has made the wide spread availability of technology for implementing techniques which can provide authenticated communications that also can be made secure against eavesdropping or tampering.

Prime users of a secure network of communicators include the banking community who has a need for ensuring that funds, electronically transferred, are sent correctly: a message authentication problem. Similarly, the stocks and securities community which operates on a computer network, has a requirement that the buy and sell of stocks are authentically sent to and from the correct person.

In response to this revolution and awareness, communicators increasingly have become aware of communications privacy and security. A technical solution for providing security against both eavesdropping and the injection of illegitimate messages, includes cryptography. Two generic approaches to key distribution are classical cryptographic techniques and public key cryptographic techniques. Classical cryptography requires that for ensuring secure communications, communicators must have keys that are identical. The encryption key is used to "lock" or secure the messages and a receiver must have an identical key to "unlock" or decrypt the messages. A problem arises with key distribution in a large network of communicators who wish to communicate with each other securely.

A major problem with classical cryptographic techniques is key distribution in a large network which requires n(n−1)/2 keys for n nodes. As shown in FIG. 1, a message, M, which is encrypted with an encryption key $E_A$, into a cipher text, C, requires having the key distributed over a private channel to the receiver. This requirement includes generating, storing, distributing, destructing and archiving of key variables which are essential elements of encipherment. Typically, a courier is responsible for distributing the keys over the private channel. For a large network of communicators, this requires a courier to distribute the key to many users. Further, if all communicators in the network are using the same key, and if the key is compromised by any one communicator, then the whole network is compromised.

The advent of inexpensive electronics hardware has facilitated means for providing the security of communications. In computer communications networks in particular, public key cryptography, which may be viewed as a multiple access cryptographic technique, provides a relatively inexpensive means for distributing keys among communicators and ensuring communications privacy and message authentication in comparison to conventional cryptographic techniques.

Public Key Cryptographic Concepts

Public key cryptographic systems are based on the trapdoor one-way function. Consider first, the concept of a one-way function. A one-way function is an easily computed function whose inverse is computationally infeasible to find. That is, for a $Y=f(X)$, given an X, Y is easy to compute. However, given a Y, X is difficult to compute.

The Diffie-Hellman public key cryptographic systems are based on exponentiation of a number p, in a Galois field, GF(p).

The basic computations for the Diffie-Hellman public key encryption are as follows:

ENCRYPTION: $Y = X^E$ modulo $p$

DECRYPTION: $X = Y^D$ modulo $p$ $X$, $Y$ are integers $< p$.

where X is the plain-text, Y is the ciphertext, E is the secret encryption exponent and D is the secret decryption exponent.

A key management system based on the work of Diffie-Hellman and Hellman-Pohlig, and independently on the work of Merkle, is two pronged: first, a common secret number is established between two communicators, without either communicator having exchanged any secret information. Second, this common secret number is then used as a key in conventional cryptographic systems, for example, employing the Data Encryption Standard (DES), for enciphering messages. The security of the Diffie-Hellman system rests on the difficulty of performing discrete logarithms in the finite field of integers modulo a very large prime number, p, denoted GF(p). A basic conjecture is that exponentiation in GF(p) is a one-way function for a large prime number p. Given X is an integer, and an X and N, it is easy to compute the equation $Y=X^N$ modulo p, where $0 \leq X \leq p$. Given Y and X it is hard to compute N in the above equation, because it is computationally hard to take a discrete logarithm, $N=\log_X(Y)$, in GF(p). Indeed, for the best known algorithm for finding discrete logarithms, GF(p), it is believed to be impractical to compute the discrete logarithm on a Cray machine when p is a 1000-bit prime number. In contrast, it takes a fraction of a second to compute the exponentiation, GF(p). Encryption and decryption are both done with exponentiation.

For example, an encryption exponent E and decryption exponent D can be derived using Euler's Theorem from number theory to satisfy $$D \cdot E = 1 \text{ modulo } (p-1)$$

This is a necessary relationship for D to be the exponential inverse of E; that is, $(X^E)^D = 1$ modulo p. This relationship can be used to encrypt a message X, an integer less than p, by the exponentiation operation $$Y = X^E \text{ modulo } p$$

and to decrypt this message by another exponentiation operation, $$X = Y^D \text{ modulo } p.$$

Here E and D are kept secret and E can be obtained easily from D and vice versa. Given p, X, and Y satisfying the above two equations it is computationally difficult to find the secret encryption exponent E for a large prime number p, due to the difficult problem of taking discrete logarithms in GF(p). For a prime number p of 512 bits it is estimated to be many times more difficult to perform a discrete logarithm than a brute force attack on the DES algorithm.

An important property of the encryption and decryption function based on exponentiation in GF(p) is the commutative property where $$(X^{E1} \text{ modulo } p)^{E2} \text{ modulo } p = (X^{E2} \text{ modulo } p)^{E1}$$

modulo p.

This property allows two communicators in a network, hypothetically terminal A and terminal B, to share a secret number by only exchanging non-secret numbers.

Assume the entire network has fixed known constants (not necessarily secret):

$$p = \text{prime number}$$

and a is any integer between 0 and $p-1$.

For terminal A and terminal B to obtain a shared secret number, terminal A randomly generates a secret number, $$X_A = \text{terminal A's secret number,}$$

and computes a corresponding public number,
$$Y_A = a^{X_A} \text{ modulo } p.$$

Terminal B also randomly generates a secret number, $$X_B = \text{terminal B's secret number,}$$

and computes a corresponding public number, $$Y_B = a^{X_B} \text{ modulo } p.$$

For a large prime number, it practically is impossible to obtain the secret numbers from the public numbers.

Terminal A and terminal B can share a secret number that is unique to them while only exchanging non-secret public numbers. Specifically, suppose terminal A sends his public number, $Y_A$, to terminal B while terminal B sends his public number, $Y_B$, to terminal A. By the commutative property, terminal A can compute $$Z = Y_B^{X_A} \text{ modulo } p$$

while terminal B can compute the same number by $$Z = Y_A^{X_B} \text{ modulo } p.$$

Next terminal A and terminal B compute Z*, the reciprocal of Z, such that $$Z \cdot Z^* = 1 \text{ modulo } (p-1).$$

In a particular Diffie-Hellman system the prime number p is chosen to satisfy $$p = 2q + 1$$

where q is a prime number. Then if Z is an odd integer, $$Z^* = Z^{q-2} \text{ modulo } (p-1)$$

which is another exponentiation. If Z is not an odd number then terminal A and terminal B first can convert Z to an odd number and then compute Z*.

The shared secret numbers Z and Z* are used by terminal A and terminal B to encrypt and decrypt messages where E = Z is the encryption exponent and D = Z* is the decryption exponent. For most encrypted network applications terminal A and terminal B would exchange encryption keys for conventional encryptors using Z and Z*. This is because encryption with exponentiation may be too slow for most data networks.

The basic Diffie-Hellman technique is illustrated in FIG. 2, with secret numbers shown enclosed inside boxes. For this illustration, the secret numbers are never transmitted in the clear or delivered by couriers. A message M sent by terminal A and terminal B can be keys for conventional encryptors.

It may be desirable for both terminal A and terminal B to contribute independent random bits to the generation of keys. For example, terminal A and terminal B can independently generate random bits to form messages which they exchange securely using Z and Z* as shown above. The final encryption keys can then be some function of these independently and randomly generated bit sequences such as taking bit by bit modulo 2 addition of the two bit sequences. Another possibility is for terminal A and terminal B to independently generate new secret and public numbers, exchange these public numbers, compute a new shared secret number S, and combine this with the original shared secret number Z to form secret encryption keys. For example, keys might be of the form $M = Z \cdot S$ modulo p.

RSA System

RSA is a public key encryption technique invented by Rivest, Shamir, and Adleman, supra. The security of the RSA system rests on the difficulty of factoring integers into their prime components. As with the Diffie-Hellman system, encryption and decryption are both done with exponentiation. In the RSA system, however, the modulus is not a prime number as in the Diffie-Hellman technique. Instead, the modulus is a product of two secret prime numbers and for security the modulus must be unique to each user in the network.

Using the RSA system, terminal A and terminal B can exchange secret messages by first exchanging non-secret public numbers. Terminal B first randomly generates two large secret prime numbers, $(p_B, q_B)$ = terminal B's secret prime numbers.

a secret decryption exponent, $D_B$ = terminal B's secret decryption exponent, and a non-secret public encryption exponent, $E_B$ = terminal B's public encryption exponent which satisfies $E_B \cdot D_B = 1$ modulo $[(p_B - 1)(q_B - 1)]$.

In general, to obtain $D_B$ from $E_B$, one would have to know the prime numbers $p_B$ and $q_B$. Hence without knowledge of terminal B's secret prime numbers, knowing the public encryption exponent $E_B$ does not reveal the decryption exponent $D_B$. In order for the RSA system to be "strong", each of the numbers $p-1$ and $q-1$ should have large prime factors.

For terminal A to send a secret message to terminal B, terminal B must send to terminal A his public numbers $E_B$ and $N_B = p_B q_B$.

Then terminal A can send the message X by exponentiation, $Y = X^{E_B}$ modulo $N_B$ Only terminal B can decrypt this message by similar exponentiation with his secret decryption exponent, $X = Y^{D_B}$ modulo $N_B$ In addition, terminal B can send a certified non-secret message M to terminal A by sending his, $C = M^{D_B}$ modulo $N_B$ terminal A can obtain M from $M = C^{E_B}$ modulo $N_B$ since she knows terminal B's public numbers. In fact, anyone that has terminal B's public numbers can obtain the message M from C. Only terminal B, however, could have computed C from M. Upon converting C to M, terminal A or anyone else who has terminal B's public numbers knows that the message M came from terminal B. Thus, the message M has been signed (authenticated or certified) by terminal B in this procedure. Terminal A also can randomly generate secret prime numbers, $(p_A, q_A)$ = terminal A's secret prime numbers, a secret decryption exponent, $D_A$ = terminal A's secret decryption exponent, and a non-secret public encryption exponent, $E_A$ = terminal A's public encryption exponent, which satisfies (using Euler's Theorem)

$E_A \cdot D_A = 1$ modulo $[(p_A - 1)(q_A - 1)]$.

If terminal A and terminal B were to exchange their public numbers then they can exchange secret signed messages in both directions. For a network of encryptors these secret messages are typically keys for conventional encryptors. FIG. 3 illustrates the RSA technique.

Note that in the RSA technique, every user in the system must have a distinct composite number made up of two large prime numbers; whereas, in the Diffie-Hellman technique a single prime number suffices for the entire network. This latter technique simplifies the computations for encryption and decryption since all the users in the network perform their computations modulo a single number, p.

OBJECTS AND SUMMARY OF THE INVENTION

An object of the present invention is to provide a protocol for establishing secure secret keys between two or more terminals communicating through a network center.

Another object of the present invention is to remove key management at the network center.

A further object of the present invention is to enable hardware-limited user terminals to obtain a common secret key in a reasonable time.

An additional object of the present invention is to provide a common secret key for a plurality of users in a network.

A still further object of the present invention is to provide secret keys for users in a mobile radio cellular network.

According to the present invention, as embodied and broadly described herein, a cryptographic communications system for use with a first terminal, a second terminal and a network center, is provided comprising first and second generator means, first and second structure means, first, second and third encoding means, request generating means, first and second decoding means, and verifying means. The first and second generating means may be embodied and first and second key-encryption-key generator, the first and second structure means may be embodied as first and second data structure device, first, and second and third encoding means my be embodied as first public-key-encoding device, second public-key-encoding device, and classical key encoding device, respectively. Request generating means may be a part of the network center or a separate requesting device. The first and second decoding means may be embodied as public-key-decoding device and classical-key-decoding device, respectively. The verifying means may be embodied as data-structure-verification device.

The first key-encryption-key generator is located at the first terminal and generates a first key-encryption-key signal. The first data-structure device is located at the first terminal and generates a first structured-data signal. The first public-key-encoding device is located at the first terminal and is coupled to the first key-encryption-key generator, the first data-structure device and the communications channel. Using a public-key-encryption algorithm, the first public-key-encryption device transforms the first key-encryption-key signal and the first structured-data signal to a first ciphertext signal, and for transmits the first ciphertext signal over the communications channel.

At the network center, and in response to receiving the first ciphertext signal, a requesting device generates a request signal and transmits the request signal over the communications channel to the second terminal.

At the second terminal and in response to receiving the request signal, the second key-encryption-key generator generates a second key-encryption-key signal. The second data-structure device generates a second structured-data signal. The second public-key-encoding device, which is coupled to the second key-encryption-key generator, the second data-structure device and the communications channel, transforms, using the public-key-encryption algorithm, the second key-encryption-key signal and the second structured-data signal to a second ciphertext signal, and transmits the second ciphertext signal over the communications channel.

At the network center, the public-key-decoding device, which is coupled to the communications channel, decodes, using a public-key-decryption algorithm, the first ciphertext signal and the second ciphertext signal. This results in generating the first key-encryption-key signal, the first structured-data signal, the second key-encryption-key signal and the second structured-data signal, at the network center.

The data-structure-verification device, which is located at the network center and coupled to the public-key-decoding device, verifies the first structured-data signal and the second structured-data signal and generates a verification signal. The classical-key-encoding device, which is located at the network center, is coupled to the data-structure-verification device, the public-key decoding device, and the communications channel. In response to the verification signal, the classical-key-encoding device transforms, using a classical-key-encryption algorithm, the first key-encryption-key signal and the second key-encryption-key signal to a third ciphertext signal and transmits the third ciphertext signal over the communications channel.

At the first terminal and coupled to the communications channel, the classical-key-decoding device decodes, using a classical-key-decryption algorithm and the first key-encryption-key signal, the third ciphertext signal. This results in generating the second key-encryption-key signal at the first terminal.

A second aspect of the present invention includes a method for establishing cryptographic communications comprising the steps of: generating a first key-encryption-key signal; transforming, using a public-key-encryption algorithm, the first key-encryption-key signal to a first ciphertext signal; generating a second key-encryption-key signal; transforming, using the public-key-encryption algorithm, the second key-encryption-key signal to a second ciphertext signal; decoding, using the public-key-decryption algorithm, the first ciphertext signal and the second ciphertext signal, thereby generating the first key-encryption-key signal and the second key-encryption-key signal; transforming, using a classical-key-encryption algorithm, the first key-encryption-key signal and the second key-encryption-key signal to a third ciphertext signal; and decoding, using a classical-key-decryption algorithm and the first key-encryption-key signal, the third ciphertext signal thereby generating the second key-encryption-key signal.

Additional objects and advantages of the invention will be set forth in part in the description that follows, and in part will be obvious from the description, or may be learned by the practice of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 4 illustrates a cryptographic communications system according to the present invention; and FIG. 5 illustrates a cryptographic communications system having a data-structure device according to the present invention;

FIG. 6 illustrates a cryptographic communications system according to the present invention for use with a plurality of terminals.

DETAILED DESCRIPTION OF THE PREFERRED EMBODIMENTS

Figure 1:
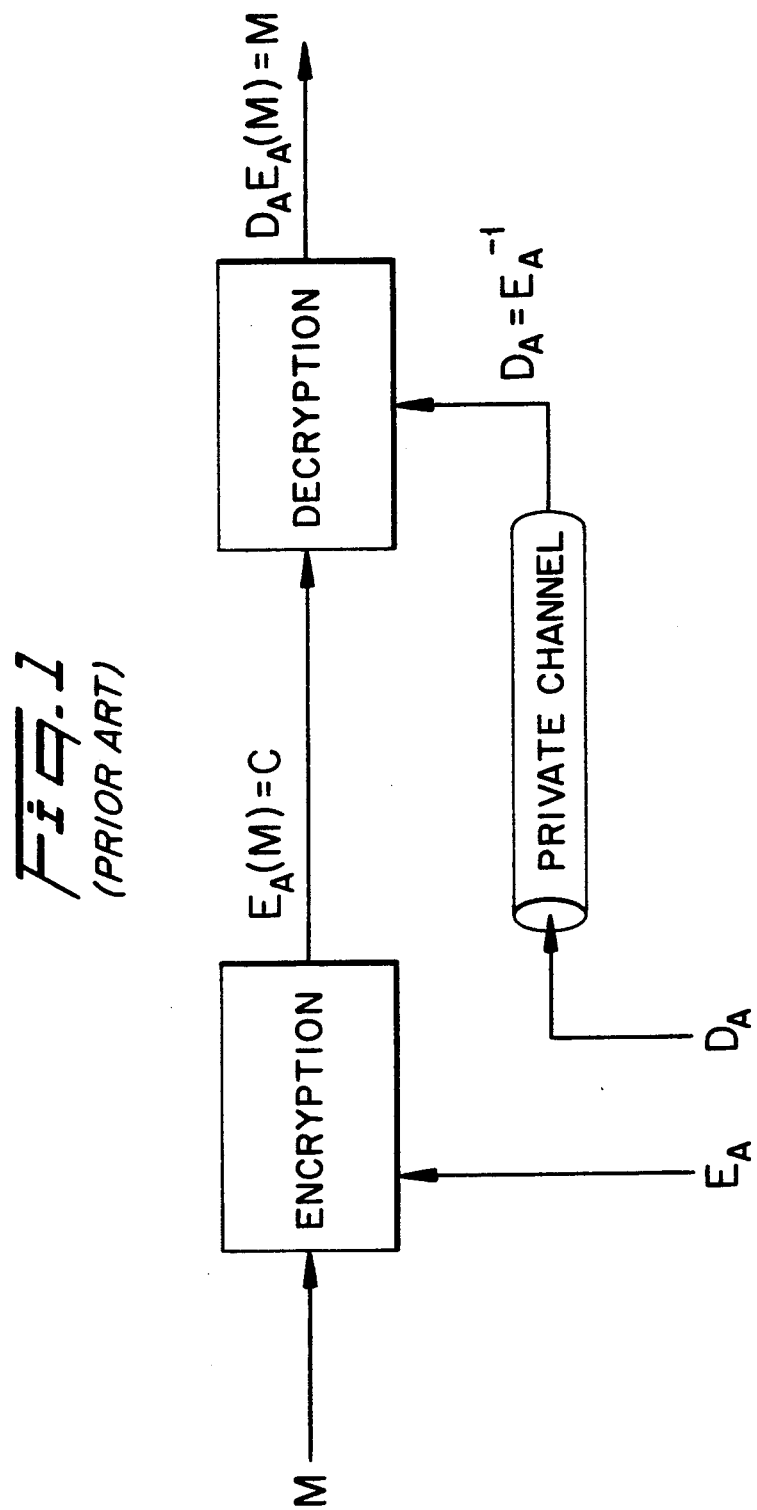
FIG. 1 illustrates a classical cryptographic system having the decryption key transferred over a private channel.
Figure 2:
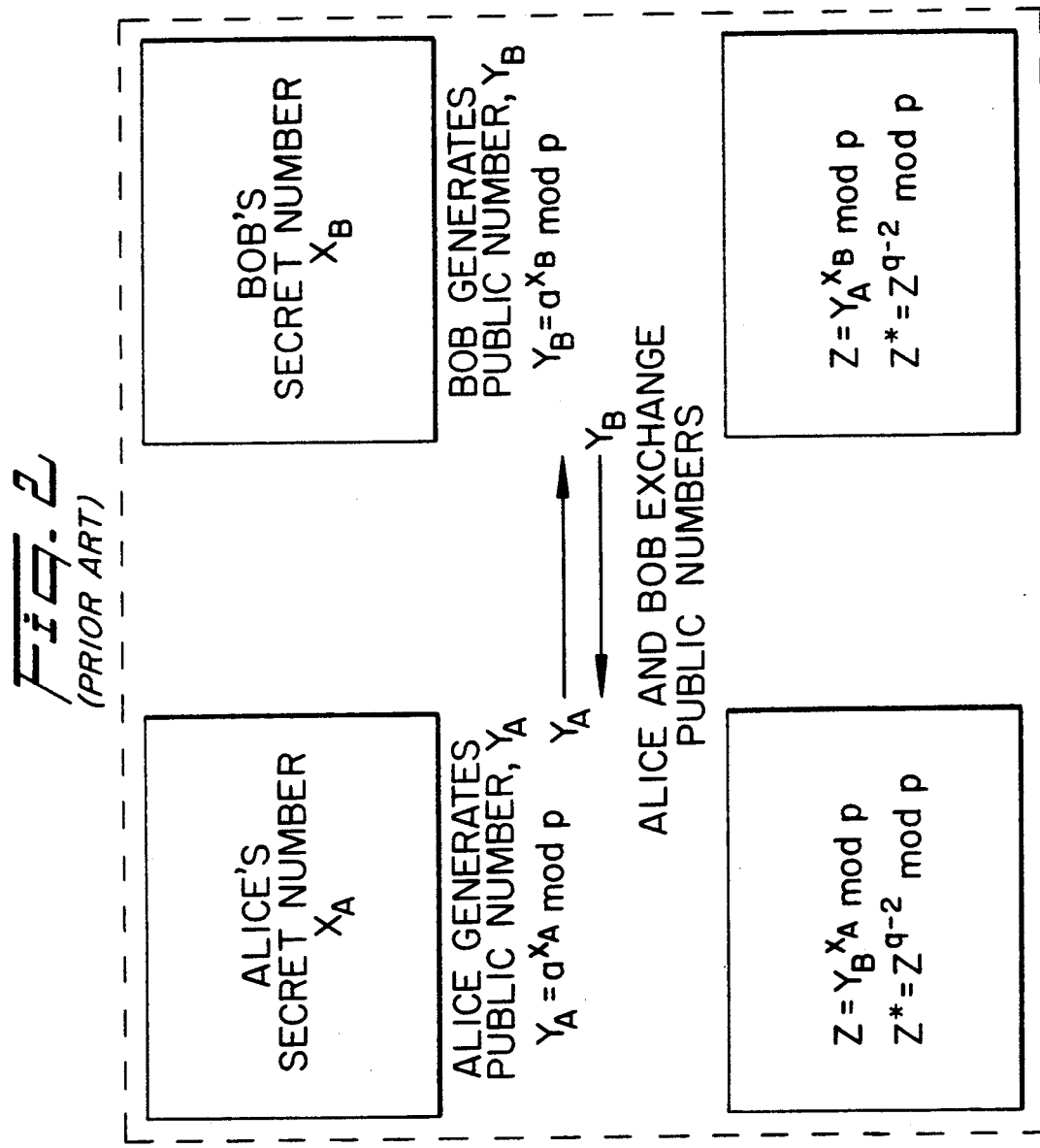
FIG. 2 illustrates the Diffie-Hellman public key cryptographic system.
Figure 3:
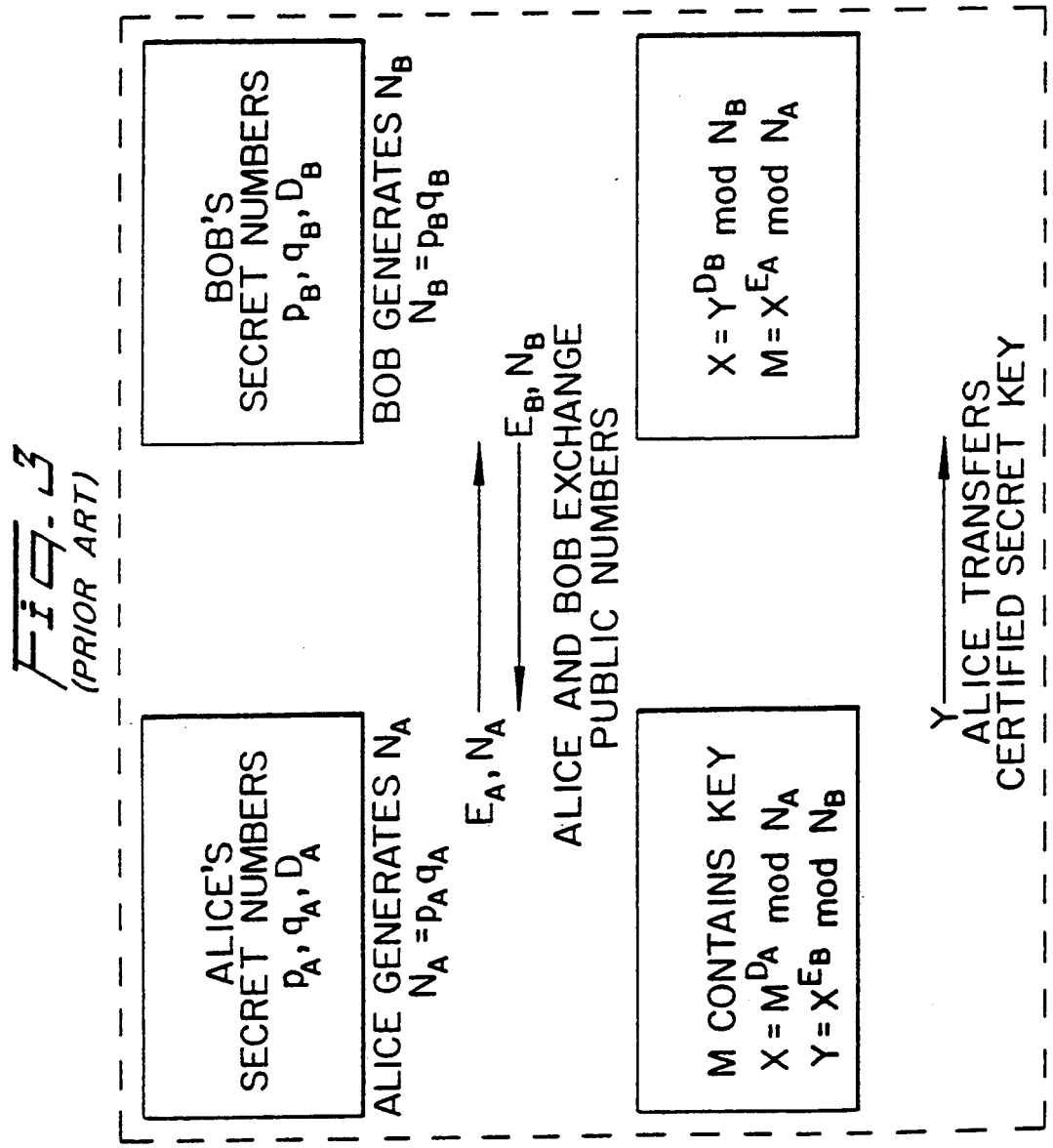
FIG. 3 illustrates the Rivest-Shamir-Adleman cryptographic system.

Reference will now be made in detail to the present preferred embodiments of the invention, examples of which are illustrated in the accompanying drawings, wherein like numerals indicate like elements throughout the several views.

As illustratively shown in FIG. 4, a cryptographic communications system is shown for use with a first terminal 20, a second terminal 40, and a network center 30. The cryptographic communications system comprises first and second generator means, first and second structure means, first, second and third encoding means, request generating means, first and second decoding means, and verifying means. The first and second generating means may be embodied as first and second key-encryption-key generators 24, 44. The first, second and third encoding means may be embodied as first public-key-encoding device 22, second public-key-encoding device 42, and classical-key-encoding device 34, respectively. Request generating means may be a part of the network center 30 or a separate requesting device. The first and second decoding means may be embodied as public-key-decoding device 32 and classical-key-decoding device 26, respectively.

In the exemplary arrangement shown in FIG. 4, the first terminal 20 includes a first key-encryption-key generator 24, a first public-key-encoding device 22, and a classical-key-decoding device 26. The first key-encryption-key generator 24 is coupled to the first public-key-encoding device 22. The first public-key-encoding device 22 and the classical-key-decoding device 26 are coupled to a communications channel.

The network center 30 includes a classical-key-encoding device 34 and a public-key-decoding device 32. The public-key-decoding device 32 is coupled to the classical-key-encoding device 34, and they are both coupled to the communications channel.

A second terminal 40 is shown having a second key-encryption-key generator 44 and a second public-key-encoding device 42. The second key-encryption-key generator 44 is coupled to the public-key-encoding device 42, and the public-key-encoding device 42 is coupled to the communications channel.

As shown in FIG. 5, the present invention can further include a first data-structure device 28 located at the first terminal 20, which is coupled to the first public-key-encoding device 22. Also, a second data-structure device 48 located at the second terminal 40, is coupled to the second public-key-encoding device 42. Additionally, a data-structure-verification device 36 is coupled to the classical-key-encoding device 34 and the public-key-decoding device 32 at the network center 30. First key-encryption-key generator 34 is located at the first terminal 20 and generates a first key-encryption-key signal. The first public-key-encoding device 22 is located at the first terminal and is coupled to the first key-encryption-key generator 24 and a communications channel. The communications channel provides a link between first terminal 20 and network center 30, and between second terminal 40 and network center 30.

Using a public-key-encryption algorithm, the first public-key-encryption device 22 transforms the key-encryption-key signal from the key-encryption-key generator 24 to a first ciphertext signal. The first public-key-encoding device 22 thereby transmits the first ciphertext signal over the communications channel.

The network center 30 receives the first ciphertext signal. In response to receiving the first ciphertext signal, the network center 30, using a requesting device, generates a request signal and transmits the request signal over the communications channel to the second terminal 40.

At the second terminal 40 and in response to receiving the request signal, the second key-encryption-key generator 44 generates a second key-encryption-key signal. The second public-key-encoding device 42 is coupled to the second key-encryption-key generator 44. The second public-key-encoding device 42 transforms, using the public-key-encryption algorithm, the second key-encryption-key signal to a second ciphertext signal, and transmits the second ciphertext signal over the communications channel to the network center 30.

At the network center 30, the public-key-decoding device 32, which is coupled to the communications channel, decodes, using a public-key-decryption algorithm, the first ciphertext signal and the second ciphertext signal. This results in generating the first key-encryption-key signal and the second key-encryption-key signal at the network center 30.

The classical-key-encoding device 34, is coupled to the public-key-decoding device 32 and to the communications channel. The classical-key-encoding device 34 transforms, using a classical-key-encryption algorithm, the first key-encryption-key signal and the second key-encryption-key signal to a third ciphertext signal, and transmits the third ciphertext signal over the communications channel to the first terminal 20.

At the first terminal 20, the classical-key-decoding device 26 decodes the first ciphertext signal and the first key-encryption-key signal. This results in producing the second key-encryption-key signal at the first terminal. At this point, both the first terminal 20 and the second terminal 40 have the second key-encryption-key signal, which may be used as a key for any standard encryption algorithm.

Alternatively, the first key-encryption-key signal may be the desired message to be passed from the first terminal 20 to the second terminal 40. In this case, which is deemed equivalent and employs the embodiment shown in FIG. 4, the third ciphertext signal is transmitted over the communications channel to the second terminal 40. At the second terminal 40, a classical-key-decoding device decodes the third ciphertext signal, using a classical-key-decryption algorithm, and the second key-encryption-key signal.

As shown in FIG. 5, the present invention can further include first and second structure means and verifying means. The first and second structure means may be embodied as first data-structure device 28 located at the first terminal 20, and a second data-structure device 48 located at the second terminal 40, respectively. The verifying means may be embodied as a data-structure-verification device 36 located at the network center 30. The first data-structure device is coupled to the first public-key-encoding device 22. The second data-structure device 48 is coupled to the second public-key-encoding device 42. The data-structure-verification device 36 is coupled to the public-key-decoding device 32 and to the classical-key-encoding device 34, located at the network center 30.

The first data-structure device 28 and the second data-structure device 48 can be used to introduce a structured-data signal such as a timestamp and/or identification or any other type of data structure into this signal which is passed from the first terminal 20 to the network center 30, and from the second terminal 40 to the network center 30, respectively.

Using the public-key-encryption algorithm, the first public-key-encryption device 22 transforms the first key-encryption-key signal and the first structured-data signal generated by the first data-structure device 28, to the first ciphertext signal. At the network center, the public-key-decoding device 32 decodes the first ciphertext signal and produces the first structured-data signal and the first key-encryption-key signal. The first structured-data signal is passed to the data-structured-verification device 26 to verify the particular structure in the data. For example, if the data includes a timestamp, the data-structure-verification device 36 will verify that the timestamp is within a certain bound or window.

Similarly, at the second terminal and in response to receiving the request signal, the second data-structure device 48 generates a second structured-data signal. The second public-key-encoding device 42 which is coupled to the second data-structure device 48, transforms, using the public-key-encryption algorithm, the second key-encryption-key signal and the second structured-data signal to a second ciphertext signal. The second ciphertext signal is transmitted over the communications channel to the network center 30.

At the network center 30, the public-key-decoding device 32 decodes, using the public-key-decryption algorithm, the second ciphertext signal. This results in producing the second key-encryption-key signal and the second structured-data signal. The second structured-data signal is passed to the data-structure-verification device 36, where the particular type of structure in the signal is verified.

A second aspect of the present invention includes a method for establishing a cryptographic communications comprising the steps of: generating a first key-encryption-key signal; transforming, using a public-key-encryption algorithm, the first key-encryption-key signal to a first ciphertext signal; generating a second key-encryption-key signal; transforming, using the public-key-encryption algorithm, the second key-encryption-key signal to a second ciphertext signal; decoding, using the public-key-decryption algorithm, the first ciphertext signal and the second ciphertext signal, thereby generating the first key-encryption-key signal and the second key-encryption-key signal. The steps further include transforming, using a classical-key-encryption algorithm, the first key-encryption-key signal and the second key-encryption-key signal to a third ciphertext signal; and decoding using a classical-key-decryption algorithm and the first key-encryption-key signal, the third ciphertext signal thereby generating the second key-encryption-key signal.

In operation, when a first user at the first terminal 20 desires to share a common key or secret message with a second user at the second terminal 40, the first user generates a random number $r_1$ as a first key-encryption-key using the first key-encryption-key generator 24. The first key-encryption-key signal is passed to the network center 30 using a public key scheme as embodied in the first public-key-encoding device 22. Using a public key scheme in this uplink enables each user terminal to keep only a public key of the network center 30. This type of scheme also allows hardware-limited users to perform the encryption in a reasonable time since a public-key-encryption scheme can be employed in first and second public-key-encoding device 22, 42 which requires only a small computation.

The network center 30, upon receiving the first key-encryption-key signal, generates a request signal and transmits the request signal to the second terminal 40. In response to receiving the request signal, the second terminal 40 generates a second key-encryption-key signal $r_2$ using second key-encryption-key generator 44. The second key-encryption-key signal $r_2$ will become a common key or message between the first terminal 20 and the second terminal 40. The second user at the second terminal 40 passes the second key-encryption-key signal from the second key-encryption-key generator 44 to the second public-key-encoding device 42 which encrypts the second key-encryption-key signal using a public key scheme. This encrypted signal is then passed to the network center 30 over the communications channel.

The network center 30, in response to receiving the first ciphertext signal and the second ciphertext signal, decodes these as the first key-encryption-key signal and the second key-encryption-key signal, respectively, using public-key-decoding device 32. Thus, the network center 30 has the first and second key-encryption-key signals $r_1$ and $r_2$. The network center 30 then can encrypt the second key-encryption-key signal $r_2$ with the first key-encryption-key signal $r_1$ using the classical-key-encoding device 34, employing any type of classical encryption device. At this point, public key encryption concepts are not required.

The following are examples of what might be used in the public key schemes. For example, consider the RSA cryptographic method used as the public key scheme. The modulus n is a product of p and q, where p and q are prime numbers. The encryption exponent e is chosen to be 3. The decryption exponent d is a number satisfying ed=1 (modulus L) where L=least common multiplier ((p−1), (q−1)).

Additionally, consider a simple substitution cipher which may be used as the classical key encryption scheme. An example of a simple substitution cipher is the Vernam cipher. The encryption and decryption transformation are as follows.

*Encryption:* $E(x,k) = x \oplus k$

*Decryption:* $D(x,k) = x \oplus k$

Where plus denotes addition modulo 2 for each bit.

A second example of a simple substitution cipher is based on addition modulo n:

*Encryption:* $E(x,k) = x + k$ *(modulo n)*.

*Decryption:* $D(x,k) = x - k$ *(modulo n)*.

Where x and k are any element in the modulo ring.

KEY DISTRIBUTION PROTOCOL 1 (KDP1)

The method of the present invention can be summarized as follows:

1. First terminal generates $r_1$ as a key-encryption key signal.

2. First terminal encrypts $r_1$ with network center's public key (e=3) and sends $r_1^e$ (mod n) to the network center.

3. The network center decrypts $r_1^e$ (mod n) by its secret key d and gets $(r_1^e \pmod n)^d \pmod n = r_1$.

4. The network center calls second terminal.

5. The second terminal generates $r_2$ as a session key between the first and second terminals.

6. The second terminal encrypts $r_2$ with the network center's public key (e=3) and sends $r_2^e$ (mod n) to the network center.

7. The network center decrypts $r_2^e$ (mod n) by its secret key d and gets $(r_2^e \pmod n)^d \pmod n = r_2$.

8. The network center encrypts $r_2$ by a key-encryption key $r_1$ and sends $E(r_2,r_1)$ to the first terminal.

9. The first terminal decrypts $E(r_2,r_1)$ by its key-encryption key $r_1$ and gets $D(E(r_2,r_1),r_1) = r_2$ as a session with the second terminal.

Choosing an RSA exponent e of 3 and the Vernam cipher enables the first terminal to be easily implemented.

The following discusses the security of the method of the present invention with an exponent e=3 and modulo n classical encryption.

One might question whether revealing $r_1+r_2$ (mod n), as well as $r_1^3$ (mod n) and $r_2^3$ (mod n), degrades the security of the method. Under the assumption that an opponent has knowledge of only those parameters, we can show that the security of the method is not degraded as follows.

A cryptoanalyst, by knowing the transmitted ciphertexts, obtains the following simultaneous congruencies:

$$r_1^3 = a \pmod n \quad (1)$$

$$r_2^3 = b \pmod n \quad (2)$$

$$r_1 + r_2 = c \pmod n \quad (3)$$

where a, b, and c are known constants. From these congruencies one can yield a quadratic congruence of r1(r2) in modulo n, $$r_1^2 - c\, r_1 + (\tfrac{1}{3}c)(c^3 - a - b) = 0 \; (mod\; n) \quad (4)$$

if gcd (3c,n)=1 holds.

Rabin showed that solving the quadratic congruence (4), without the knowledge of the factors of n, is as difficult as factorizing n=pq. Since the security of RSA cryptography depends on the difficulty of factorization of n, we can conclude that revealing $r_1+r_2$ (mod n) in this protocol does not degrade the security of the protocol.

In this discussion we assume that an opponent makes only a passive attack: the cryptoanalyst only uses the knowledge of transmitted ciphertext and does not participate in the protocol. In the following discussion, we will discuss the case of an active attack to the key distribution protocol.

The method provided supra, as KDP1, has a vulnerability. When legitimate first and second terminals communicate with each other to generate a common key signal, a first opponent may conspire with a second opponent to obtain the common key signal. As discussed herein the common key is the key-encryption-key signal shared by the first and second terminal. The break-in protocol requires the first opponent to conspire with the second opponent in advance. The first and second opponents agree that when either receives a request from the network center, to establish a session key for communication with the other, that they will use a jointly known key, R.

First, consider the following attack. The first opponent, listening the first terminal's communication with the network center, initiates the KDP1 method to have a session key with the second opponent, sending $r^3$ (mod n), replaying the first terminal's message to the network center. The second opponent sends a prearranged number, R, to the first opponent. Then the first opponent can apparently obtain $r_1$ and thus the common key $r_2$. Thus, the method of KDP1 is vulnerable to a replay attack.

Second, even if the network center has a mechanism for protecting from a replay attack, the following break-in protocol enables the first opponent to obtain a common key $r_2$, avoiding the protect mechanism against replay attack.

BREAK-IN PROTOCOL AGAINST KDP1

1. The first opponent chooses a random number $r_3$ and calculate $r_3^{-1}$ (mod n). He also calculates $r_1^3 r_3^3$ (mod n) and sends it with a request that the network center set up a session key for him with the second opponent.

2. The network center decrypts $r_1^3 r_3^3$ (mod n) to obtain $r_1 r_3$ (mod n).

3. The network center calls the second opponent.

4. The second opponent sends $R^3$ (mod n) to the network center.

5. The network center decrypts $R^3$ (mod n) to obtain R and computes $R + r_1 r_3$ (mod n) which sends it to the first opponent.

6. The first opponent subtracts R and multiplies the result by $r_3^{-1}$ to recover $r_1$.

7. The first opponent observed $r_1 + r_2$ (mod n), so he can subtract $r_1$ from c to recover $r_2$, that is, the session key being used by the first and second terminals.

Since $r_3$ is unknown to the center, $r_3^3$ becomes a one-time key that the first opponent can use to conceal the fact that $r_1^3$ is involved in $r_1^3 r_3^3$.

The source of weakness is the fact that $r_1^3 r_3^3 = (r_1 r_3)^3$, i.e that the RSA encryption operation is distributive.

A countermeasure against the active attack may be obtained by adding structure with the first key-encryption-key signal.

In order to destroy the ability of the first and second opponents to make use of the multiplicative property of RSA scheme, a certain predetermined structure should be provided in the data to be encrypted. One example of the structure in the data is restricting a random number, r, to be stored in the least significant 256 bit, keeping the significant 256 bit to be zero. The center should have a mechanism to check the decrypted message is in the predetermined set, M, of the message. If $r_1$ and $r_2$ are chosen randomly in M, then the probability that $r_1 r_2$ (mod n) is in M is negligibly small. Thus if an opponent sends $r_1^3 r_2^3$ (mod n) to the network center, then the center can, with high probability, recognize that an illegal message is sent.

Another measure to prevent a replay attack is generating a timestamp which can be generated at the first terminal, and concatenating it with the first key-encryption-key signal. The transmitting data from the first terminal to the center is now $$(t_a \,||\, r_1)^3 \text{ (mod n)}$$

where $t_a$ denotes a timestamp, $||$ denotes a concatenation and $r_1$ denotes a random number.

The network center should have a mechanism for checking the timeliness of the timestamp. The timestamp may include a transmitted date and time and expiring date.

Another measure to prevent is user identity verification. A mechanism for user identity verification should be provided, though this is not a direct requirement for protecting the protocol from the active attack. From our basic standpoint the identity verification should not require the center to manage secret information for each user.

We will describe a possible user verification scheme for the key distribution protocol.

The network center generates each user i's secret $s_i$ from user i's identifier, IDi, $$s_i = f(IDi)$$

where f is a polyrandom function which the center only knows. The network center distributes $s_i$ to user i in secret, possibly in the form of a smart card.

The first terminal construct a data signal, which is a concatenation of user i's secret, $s_a$, a random number, $r_1$, and other information. The first terminal encrypts the data signal and the network center decrypts the encrypted data signal and gets the user i's secret, $s_a'$. The network center calculates f(IDa) and checks if it is the same as $s_a'$ which he received. If they coincide, the network center verifies the sender. Otherwise the network center rejects the sender and quits the protocol.

Combining these three mechanisms we can state the key distribution protocol as follows.

KEY DISTRIBUTION PROTOCOL 2 (KDP2)

1. The first terminal generates $r_1$ as a key-encryption key.

2. The first terminal sends to the network center, IDa, $(t_a \,||\, s_a \,||\, r_1)^3$ (mod n).

3. The network center decrypts the encrypted data signal and gets $(t_a \,||\, s_a \,||\, r_1)$. The network center extracts $t_a$, $s_a$, and $r_1$ from the decrypted data. The network center checks the validity of the timestamp $t_a$. The network center verifies the first terminal.

4. The network center calls the second terminal.

5. The second terminal generates $r_2$ as a session key between first and second terminals.

6. The second terminal sends to the network center, IDb, $(t_b \,||\, s_b \,||\, r_2)^3$ (mod n).

7. The network center decrypts the encrypted data and gets $(t_b \,||\, s_b \,||\, r_2)$. The network center extracts $t_b$, $s_b$, $r_2$ from the decrypted data. The network center checks the validity of the timestamp $t_b$. The network center verifies the second terminal.

8. The network center sends to the first terminal, $r_1 + r_2$ (mod n).

9. The first terminal subtracts $r_1$ and gets as a session key with the second terminal In this protocol, a structure in the transmitted data prevents an enemy from utilizing the distribution property of RSA cryptography. A timestamp mechanism prevents a replay attack. A mechanism for identity verification prevents masquerading.

In the protocol, the second terminal can obtain $(t_a \,||\, s_a \,||\, r_1)^3$ (mod n) and $r_1$. The second terminal can easily guess a timestamp $t_a$. If the second terminal can get the first terminal's secret $s_a$, this cryptosystem is unsafe.

FIG. 6 illustratively shows an extension of the present invention to a plurality of terminals. The network center 30 may be coupled to the first terminal 20, the second terminal 40, a third terminal 60, and any other number of terminals, as illustratively shown, as fourth terminal 70. Each terminal may have its own public-key-encoding device, key-encryption-key generator, classical-key-decoding device, and data-structure device. As in the preferred embodiment discussed previously, the first key-encryption-key generator located at the first terminal generates a first key-encryption-key signal. The first public-key-encoding device located at the first terminal transforms the key-encryption-key signal from the key-encryption-key generator to a first ciphertext signal. The first public-key-encoding device thereby transmits the first ciphertext signal over the communications channel. The network center 30 receives the first ciphertext signal, and using a requesting device, generates a request signal and transmits the request signal over the communications channel to a plurality of terminals. The plurality of terminals is illustrated in FIG. 6 as second terminal 40, third terminal 60, and fourth terminal 70.

At each of the terminals, in response to receiving the request signal, the corresponding key-encryption-key generator located at that particular terminal generates a respective key-encryption-key signal. The corresponding public-key-encoding device which is coupled to the respective key-encryption-key generator, transforms, using the public-key-encryption algorithm, the respective key-encryption-key signal to a respective ciphertext signal, and transmit the corresponding ciphertext signal over the communications channel to the network center 30.

At the network center 30, the public-key-encoding device decodes, using the public-key-decryption algorithm, the plurality of ciphertext signals. This results in generating the first key-encryption-key signal and the plurality of key-encryption-key signals from the respective terminals at the network center 30.

The classical-key-encoding device located at the network center 30, transforms, using a classical-key-encryption algorithm, and the first key-encryption-key signal, the corresponding plurality of key-encryption-key signals to a plurality of corresponding ciphertext signals, respectively, and transmits the ciphertext signals over the communications channel to the plurality of terminals.

At each of the plurality of terminals, the classical-key-decoding device and the corresponding respective plurality of ciphertext signals and a classical-key-decryption algorithm are used with the corresponding plurality of key-encryption-key signal to produce the corresponding key-encryption-key signal at the respective terminal. At this point, each of the plurality of terminals have the first key-encryption-key signal which was generated at the first terminal, and the first key-encryption-key signal may be used as a key for any standard encryption algorithm.

It will be apparent to those skilled in the art that various modifications can be made to the key distribution protocol for digital mobile communications of the instant invention without departing from the scope or spirit of the invention, and it is intended that the present invention cover modifications and variations of the key distribution protocol for digital mobile communication, provided they come within the scope of the appended claims and their equivalents

We claim:

1. A cryptographic communications system for use with a first terminal, a second terminal, a communications channel, and a network center, comprising:

first generator means located at said first terminal for generating a first key-encryption-key signal;

first structure means located at said first terminal for generating a first structured-data signal;

first encoding means located at said first terminal and coupled to said first generator means, said first structure means and said communications channel, for transforming, using a public-key-encryption algorithm, the first key-encryption-key signal and the first structured-data signal to a first ciphertext signal, and for transmitting the first ciphertext signal over said communications channel;

means located at said network center and responsive to receiving the first ciphertext signal for generating a request signal and transmitting the request signal over said communications channel;

second generator means located at said second terminal and responsive to the request signal for generating a second key-encryption-key signal;

second structure means located at said second terminal for generating a second structured-data signal;

second encoding means located at said second terminal and coupled to said second generator means, said second structure means and said communications channel, for transforming, using the public-key-encryption algorithm, the second key-encryption-key signal and the second structured-data signal to a second ciphertext signal, and for transmitting the second ciphertext signal over said communications channel;

first decoding means located at said network center and coupled to said communications channel for decoding, using a public-key-decryption algorithm, the first ciphertext signal and the second ciphertext signal, thereby generating the first key-encryption-key signal, the first structured-data signal, the second key-encryption-key signal and the second structured-data signal;

means located at said network center and coupled to said first decoding means for verifying the first structured-data signal and the second structured-data signal and for generating a verification signal;

third encoding means located at said network center, coupled to said decoding means, said verifying means, and said communications channel, and responsive to the verification signal, for transforming, using a classical-key-encryption algorithm, the first key-encryption-key signal and the second key-encryption-key signal to a third ciphertext signal and for transmitting the third ciphertext signal over said communications channel; and second decoding means located at said first terminal and coupled to said communications channel for decoding, using a classical-key-decryption algorithm and the first key-encryption-key signal, the third ciphertext signal thereby generating the second key-encryption-key signal.

2. The cryptographic system as set forth in claim 1 wherein:

said first structure means generates the first structured-data signal with a first time-stamp signal; and said verifying means verifies the first time-stamp signal.

3. The cryptographic system as set forth in claim 1 wherein:

said first structure means generates the first structured-data signal with a first identification signal; and said verifying means verifies the first identification signal.

4. The cryptographic system as set forth in claim 1 wherein:

said second structure means generates the second structured-data signal with a second time-stamp signal; and said verifying means verifies the second time-stamp signal.

5. The cryptographic system as set forth in claim 1 wherein:

said second structure means generates the second structured-data signal with a second identification signal; and said verifying means verifies the second identification signal.

6. The cryptographic system as set forth in claim 1 wherein said first encoding means includes means for exponentiating the first key-encryption-key signal and the first structured-data signal modulo a modulus number, for generating the first ciphertext signal.

7. The cryptographic system as set forth in claim 1 wherein said second encoding means includes means for exponentiating the second key-encryption-key signal and the second structured-data signal modulo a modulus number, for generating the second ciphertext signal.

8. A cryptographic communications system for use with a first terminal, a second terminal, a communications channel, and a network center, comprising:

first generator means located at said first terminal for generating a first key-encryption-key signal;

first encoding means located at said first terminal and coupled to said first generator means and said communications channel, for transforming, using a public-key-encryption algorithm, the first key-encryption-key signal to a first ciphertext signal, and for transmitting the first ciphertext signal over said communications channel;

second generator means located at said second terminal for generating a second key-encryption-key signal;

second encoding means located at said second terminal and coupled to said second generator means and said communications channel, for transforming, using the public-key-encryption algorithm, the second key-encryption-key signal to a second ciphertext signal, and for transmitting the second ciphertext signal over said communications channel;

first decoding means located at said network center and coupled to said communications channel for decoding, using a public-key-decryption algorithm, the first ciphertext signal and the second ciphertext signal, thereby generating the first key-encryption-key signal and the second key-encryption-key signal;

third encoding means located at said network center and coupled to said decoding means and said communications channel for transforming, using a classical-key-encryption algorithm, the first key-encryption-key signal and the second key-encryption-key signal to a third ciphertext signal and for transmitting the third ciphertext signal over said communications channel; and second decoding means located at said first terminal and coupled to said communications channel for decoding, using a classical-key-decryption algorithm and the first key-encryption-key signal, the third ciphertext signal thereby generating the second key-encryption-key signal.

9. The cryptographic communications system as set forth in claim 8 further including:

first structure means located at said first terminal for generating a first structured-data signal; and wherein said first encoding means is coupled to said first structure means for transforming, using the public-key-encryption algorithm, the first key-encryption-key signal and the first structured-data signal to the first ciphertext signal.

10. The cryptographic system as set forth in claim 9 further including means located at said network center and coupled to said first decoding means for verifying the first structured-data signal and for generating a verification signal; and wherein said third encoding means is coupled to said verifying means and is responsive to the verification signal for transforming, using a classical-key-encryption algorithm, the first key-encryption-key signal and the second key-encryption-key signal to the third ciphertext signal and for transmitting the third ciphertext signal over said communications channel.

11. The cryptographic system as set forth in claim 8 further including:

second structure means located at said second terminal for generating a second structured-data signal; and wherein said second encoding means is coupled to said second structure means for transforming, using the public-key-encryption algorithm, the second key-encryption-key signal and the second structured-data signal to the second ciphertext signal.

12. The cryptographic system as set forth in claim 11 further including means located at said network center and coupled to said first decoding means for verifying the second structured-data signal and for generating a verification signal; and wherein said third encoding means is coupled to said verifying means and is responsive to the verification signal for transforming, using the classical-key-encryption algorithm, the first key-encryption-key signal and the second key-encryption-key signal to the third ciphertext signal and for transmitting the third ciphertext signal over said communications channel.

13. The cryptographic system as set forth in claim 8 further including:
means located at said network center and responsive to receiving the first ciphertext signal for generating a request signal and for transmitting the request signal over said communications channel; and
wherein said second generator means is responsive to said request signal for generating the second key-encryption-key signal.

14. The cryptographic system as set forth in claim 8 wherein said first encoding means includes means for exponentiating the key-encryption-key signal modulo a modulus number, for generating the first ciphertext signal.

15. The cryptographic system as set forth in claim 8 wherein said second encoding means includes means for exponentiating the key-encryption-key signal modulo a modulus number, for generating the second ciphertext signal.

16. A method for establishing cryptographic communications using a first terminal, a second terminal, a communications channel, and a network center, comprising the steps of:
generating at said first terminal a first key-encryption-key signal and a first structured-data signal;
transforming, using a public-key-encryption algorithm, at said first terminal, the first key-encryption-key signal and the first structured-data signal to a first ciphertext signal;
transmitting the first ciphertext signal over said communications channel;
generating at said network center, in response to receiving the first ciphertext signal, a request signal;
transmitting from said network center the request signal over said communications channel;
generating at said second terminal in response to receiving the request signal a second key-encryption-key signal;
generating at said second terminal a second structured-data signal;
transforming at said second terminal, using the public-key-encryption algorithm, the second key-encryption-key signal and the second structured-data signal to a second ciphertext signal;
transmitting the second ciphertext signal over said communications channel;
decoding at said network center, using a public-key-decryption algorithm, the first ciphertext signal and the second ciphertext signal, thereby generating the first key-encryption-key signal, the first structured-data signal, the second key-encryption-key signal and the second structured-data signal;
verifying at said network center the first structured-data signal and the second structured-data signal and generating a verification signal;
transforming at said network center in response to the verification signal, using a classical-key-encryption algorithm, the first key-encryption-key signal and the second key-encryption-key signal to a third ciphertext signal;
transmitting the third ciphertext signal over said communications channel; and
decoding at said first terminal, using a classical-key-decryption algorithm and the first key-encryption-key signal, the third ciphertext signal, thereby generating the second key-encryption-key signal.

17. The method as set forth in claim 16 wherein:
said generating step of said first terminal generates the first structured-data signal with a first time-stamp signal; and
said verifying step verifies the first time-stamp signal.

18. The method as set forth in claim 16 wherein:
said generating step at said first terminal generates the first structured-data signal with a first identification signal; and
said verifying step verifies the first identification signal.

19. The method as set forth in claim 16 wherein:
said generating step at said second terminal generates the second structured-data signal with a second time-stamp signal; and
said verifying step verifies the second time-stamp signal.

20. The method as set forth in claim 16 wherein:
generating step at said second terminal generates the second structured-data signal with a second identification signal; and
said verifying step verifies the second identification signal.

21. The method as set forth in claim 16 wherein said transforming step at said first terminal includes an exponentiation of the first key-encryption-key signal and the structured-data signal modulo a modulus number, for generating the first ciphertext signal.

22. The method as set forth in claim 16 wherein said transforming step at said second terminal includes an exponentiation of the second key-encryption-key signal and the structured-data signal modulo a modulus number, for generating the second ciphertext signal.

23. The method as set forth on claim 16 further comprising the steps of:
generating at a third terminal in response to receiving the request signal a third key-encryption-key signal and a third structured-data signal;
transforming at said third terminal, using the public-key-encryption algorithm, the third key-encryption-key signal and the third structured-data signal to a fourth ciphertext signal;
transmitting the fourth ciphertext signal over a communications channel;
decoding at said network center, using a public-key-decryption algorithm, the fourth ciphertext signal, thereby generating the third key-encryption-key signal and the third structured-data signal;
verifying at said network center the third structured-data signal and generating a verification signal;
transforming at said network center using the classical-key-encryption algorithm, the third key-encryption-key signal and the second key-encryption-key signal to a fifth ciphertext signal;
transmitting the fifth ciphertext signal over said communications channel; and
decoding at said third terminal, using a classical-key-decryption algorithm and the third key-encryption-key signal, the fifth ciphertext signal, thereby generating the second key-encryption-key signal.

24. A method for establishing cryptographic communications comprising the steps of:
generating a first key-encryption-key signal;
transforming, using a public-key-encryption algorithm, the first key-encryption-key signal to a first ciphertext signal;

generating a second key-encryption-key signal;
transforming, using the public-key-encryption algorithm, the second key-encryption-key signal to a second ciphertext signal;
decoding, using the public-key-decryption algorithm, the first ciphertext signal and the second ciphertext signal, thereby generating the first key-encryption-key signal and the second key-encryption-key signal;
transforming, using a classical-key-encryption algorithm, the first key-encryption-key signal and the second key-encryption-key signal to a third ciphertext signal; and
decoding, using a classical-key-decryption algorithm and the first key-encryption-key signal, the third ciphertext signal thereby generating the second key-encryption-key signal.

25. The method for establishing cryptographic communications as set forth in claim 24 further comprising the steps of:
generating a first structured-data signal; and
transforming the first key-encryption-key signal and the first structured-data signal to the first ciphertext signal.

26. The method for establishing cryptographic communications as set forth in claim 25 further comprising the steps of:
verifying the first structured-data signal and generating a verification signal; and
transforming in response to the verification signal, using the classical-key-encryption algorithm, the first key-encryption-key signal and the second key-encryption-key signal to the third ciphertext signal.

27. The method for establishing cryptographic communications as set forth in claim 24 further comprising the steps of:
generating a second structured-data signal; and
transforming the second key-encryption-key signal and the second structured-data signal to the second ciphertext signal.

28. The method for establishing cryptographic communications as set forth in claim 27 further comprising the steps of:
verifying the second structured-data signal and generating a verification signal; and
transforming in response to the verification signal, using the classical-key-encryption algorithm, the first key-encryption-key signal and the second key-encryption-key signal to the third ciphertext signal.

29. The method for establishing cryptographic communications as set forth in claim 24 further comprising the steps of:
generating a request signal; and
generating, in response to the request signal, the second key-encryption-key signal.

30. The method for establishing cryptographic communications as set forth in claim 24 wherein said step of transforming using the public-key-encryption algorithm includes:
an exponentiation of the first key-encryption-key signal modulo a modulus number.

31. The method for establishing cryptographic communications as set forth in claim 24 wherein said step of transforming using the public-key-encryption algorithm includes:
an exponentiation of the ciphertext signal modulo a modulus number.

32. A method for establishing cryptographic communications with a first terminal and a second terminal and using a network center, comprising the steps of:
encoding a first key-encryption-key signal, $r_1$, by transforming said first key-encryption-key signal to a first ciphertext signal by computing $r_1^e \pmod{n}$, wherein e is a public key of said network center and n is a modulus number;
decoding the first ciphertext signal by computing $(r_1^e \pmod{n})^d \pmod{n}$ wherein d is a secret key of said network center;
encoding a second key-encryption-key signal, $r_2$, by transforming said second key-encryption-key signal to a second ciphertext signal by computing $r_2^e \pmod{n}$;
decoding the second ciphertext signal by computing $(r_2^e \pmod{n})^d \pmod{n}$ wherein d is the secret key of said network center;
encoding the second key-encryption-key signal and the first key-encryption-key signal to generate a third ciphertext signal; and
decoding the third ciphertext signal with the first key-encryption-key signal.

33. The method as set forth in claim 32 further comprising the steps of:
generating a third key-encryption-key signal;
transforming, using the public-key-encryption algorithm, the third key-encryption-key signal to a fourth ciphertext signal;
decoding, using the public-key-decryption algorithm, the fourth ciphertext signal, thereby generating the third key-encryption-key signal;
transforming, using a classical-key-encryption algorithm, the first key-encryption-key signal and the third key-encryption-key signal to a fifth ciphertext signal; and
decoding, using a classical-key-decryption algorithm and the first key-encryption-key signal, the fifth ciphertext signal thereby generating the third key-encryption-key signal.

34. A method for establishing cryptographic communications comprising the steps of:
generating a first key-encryption-key signal;
transforming, using a public-key-encryption algorithm, the first key-encryption-key signal to a first ciphertext signal;
generating a second key-encryption-key signal;
transforming, using the public-key-encryption algorithm, the second key-encryption-key signal to a second ciphertext signal;
decoding, using the public-key-decryption algorithm, the first ciphertext signal and the second ciphertext signal, thereby generating the first key-encryption-key signal and the second key-encryption-key signal;
transforming, using a classical-key-encryption algorithm, the first key-encryption-key signal and the second key-encryption-key signal to a third ciphertext signal; and
decoding, using a classical-key-decryption algorithm and the second key-encryption-key signal, the third ciphertext signal thereby generating the first key-encryption-key signal.

35. A method for establishing cryptographic communications with a first terminal and a second terminal and using a network center, comprising the steps of:
encoding a first key-encryption-key signal, $r_1$, by transforming said first key-encryption-key signal to a first ciphertext signal by computing $r_1{}^e \pmod{n}$, wherein e is a public key of said network center and n is a modulus number;

decoding the first ciphertext signal by computing $(r_1{}^e \pmod{n})^d \pmod{n}$ wherein d is a secret key of said network center;

encoding a second key-encryption-key signal, $r_2$, by transforming said second key-encryption-key signal to a second ciphertext signal by computing $r_2{}^e \pmod{n}$;

decoding the second ciphertext signal by computing $(r_2{}^e \pmod{n})^d \pmod{n}$ wherein d is the secret key of said network center;

encoding the second key-encryption-key signal and the first key-encryption-key signal to generate a third ciphertext signal; and decoding the third ciphertext signal with the second key-encryption-key signal.

* * * * *